United States Patent [19]

Berghmans et al.

[11] 4,123,401

[45] Oct. 31, 1978

[54] FINISHES HAVING IMPROVED SCRATCH RESISTANCE PREPARED FROM COMPOSITIONS OF FLUOROPOLYMER, MICA PARTICLES OR METAL FLAKE, A POLYMER OF MONOETHYLENICALLY UNSATURATED MONOMERS AND A LIQUID CARRIER

[75] Inventors: Jacques M. L. Berghmans, Lint, Belgium; Eva M. Vary, Wynnewood, Pa.

[73] Assignee: E. I. Du Pont de Nemours and Company, Wilmington, Del.

[21] Appl. No.: 874,491

[22] Filed: Feb. 2, 1978

Related U.S. Application Data

[63] Continuation-in-part of Ser. No. 710,618, Aug. 2, 1976, abandoned, which is a continuation-in-part of Ser. No. 597,491, Jul. 21, 1975, abandoned.

[51] Int. Cl.² ............................................. C08L 27/18
[52] U.S. Cl. ..................... 260/29.6 F; 260/29.6 RB; 260/29.6 RW; 260/29.6 MM; 260/900; 428/463

[58] Field of Search .................. 260/29.6 F, 29.6 RB, 260/29.6 RW, 29.6 MM, 900; 428/463

[56] References Cited

U.S. PATENT DOCUMENTS

| 3,037,952 | 6/1962 | Jordan et al. | 260/29.6 RW |
|---|---|---|---|
| 3,054,761 | 9/1962 | Moore et al. | 260/900 |
| 3,062,764 | 11/1962 | Osdal | 260/29.6 F |
| 3,087,827 | 4/1963 | Klenke et al. | 106/291 |
| 3,317,493 | 5/1967 | Selby | 428/463 |
| 3,682,859 | 8/1972 | Taylor et al. | 260/900 |
| 3,970,627 | 7/1976 | Seymus | 260/42.14 |

*Primary Examiner*—M. J. Welsh

[57] ABSTRACT

Compositions containing
 (a) fluoropolymer,
 (b) mica particles, mica particles coated with pigment, or metal flake,
 (c) a polymer of ethylenically unsaturated monomers, and
 (d) a liquid carrier are useful for coating metal, especially cookware, to give lubricious surfaces.

15 Claims, No Drawings

FINISHES HAVING IMPROVED SCRATCH RESISTANCE PREPARED FROM COMPOSITIONS OF FLUOROPOLYMER, MICA PARTICLES OR METAL FLAKE, A POLYMER OF MONOETHYLENICALLY UNSATURATED MONOMERS AND A LIQUID CARRIER

CROSS-REFERENCE TO RELATED APPLICATIONS

This application is a continuation-in-part of application Ser. No. 710,618, filed Aug. 2, 1976, which in turn is a continuation-in-part of application Ser. No. 597,491, filed July 21, 1975, both of which are now abandoned.

BACKGROUND OF THE INVENTION

Cookware coated with fluoropolymers, especially polytetrafluoroethylene (PTFE), has come into widespread use in recent years. Many cooks prefer to use such cookware because of its nonstick properties and because it is so easy to clean.

While cookware of this type is quite durable, the fluoropolymer coating tends to become scratched after extended use because it is somewhat softer than the utensils used to stir and turn the food in the ware.

SUMMARY OF THE INVENTION

It has now been found that the scratch resistance of a fluoropolymer coating can be improved if the composition from which the coating is derived comprises
 (a) a fluoropolymer,
 (b) mica particles, mica particles coated with pigment, or metal flake,
 (c) a polymer of monoethylenically unsaturated monomers which depolymerizes and vaporizes at about the fluoropolymer's fusion temperature, and
 (d) a liquid carrier.

Such a coating has excellent crack resistance and blister resistance, and has an aesthetically pleasing appearance.

DETAILED DESCRIPTION OF THE INVENTION

The fluoropolymers used in the compositions of the invention are homopolymers and copolymers (meaning the polymer contains two or more different monomer units) of monoethylenically unsaturated hydrocarbon monomers completely substituted with fluorine atoms or completely substituted with a combination of fluorine atoms and chlorine atoms. Included in this group are perfluoroolefin polymers such as PTFE and copolymers of tetrafluoroethylene and hexafluoropropylene in all monomer unit weight ratios, fluorochlorocarbon polymers such as polymonochlorotrifluoroethylene, and the normally solid copolymers of tetrafluoroethylene and perfluoroalkyl vinyl ethers (wherein the alkyl group is of 1-5 carbon atoms). Mixtures of these can also be used. PTFE is preferred for its thermal stability.

The fluoropolymer used is particulate. The particles are preferably small enough to pass through the nozzle of a spray gun without clogging it and are also small enough to give the resulting film integrity.

The fluoropolymer preferably has a number average molecular weight of at least about 20,000, even more peferably at least about 200,000, because such fluoropolymers give harder finishes.

The number average molecular weight of PTFE is measured by the method described by Suwa, Takahisa and Machi in *Journal of Applied Polymer Science*, Volume 17, pp. 3253–3257 (1973).

The number average molecular weight of a tetrafluoroethylene/hexafluoropropylene copolymer is measured by first determining its melt flow rate (MFR) according to ASTM D2116, using the MFR to determine melt viscosity (MV) according to the equation $$MV = \frac{pi \times \text{pressure used (mm)} \times \text{orifice radius (mm)}}{8 \times MFR \times \text{orifice length (mm)}}$$

and then determining molecular weight (MW) according to the equation $$MW = \sqrt[3.4]{\frac{MV}{1.62 \times 10^{-13}}}$$

Number average molecular weight of a fluorochlorocarbon polymer is measured by ASTM D1430.

Although a powder of fluoropolymer can be used and a carrier provided separately, a polymer in the form of an aqueous dispersion is preferred for its stability and because it is most easily obtained in that form.

The fluoropolymer is ordinarily present in the composition at a concentration of about 80–99.8%, preferably about 85–98%, by weight of the total of fluoropolymer and mica particles, mica particles coated with pigment, or metal flake.

The mica particles, coated mica particles and metal flake used in the compositions of the invention can be any of those available commercially. These particles and flakes have an average longest dimension of 10 to 200 microns, preferably 15–50 microns, with no more than 50% of the particles or flakes having longest dimensions of more than about 500 microns. Particle and flake size is measured optically against a standard.

The mica particles coated with pigment preferred for use are those described in U.S. Pat. No. 3,087,827 to Klenke and Stratton, and U.S. Pat. Nos. 3,087,828 and 3,087,829 to Linton. The disclosures of these patents are incorporated into this specification to describe the various coated micas and how they are prepared.

The micas described in these patents are coated with oxides or hydrous oxides of titanium, zirconium, aluminum, zinc, antimony, tin, iron, copper, nickel, cobalt, chromium or vanadium. Titanium dioxide coated mica is preferred because of its availability. Mixtures of coated micas can also be used.

Representative of the metal flake which can be used are aluminum flake, stainless steel flake, nickel flake and bronze flake. Mixtures of flake can also be used.

The mica, coated mica or metal flake is ordinarily present in a composition of the invention at a concentration of about 0.2–20%, by weight of the total of fluoropolymer and mica, coated or metal flake, preferably about 2–15%, even more preferably about 8–12%.

The polymer of monoethylenically unsaturated monomers used in the compositions of the invention can be any polymer or copolymer (in the sense of being composed of two or more types of monomers) of ethylenically unsaturated monomers which depolymerizes, and whose depolymerization products vaporize, in the temperature range of from about 150° C below the fusion temperature of the fluoropolymer used to about the fluoropolymer's decomposition temperature. The closer the depolymerization and vaporization temperatures are to the fluoropolymer's fusion temperature, the better. It is desirable that the polymer of monoethylenically unsaturated monomers either be in solution in a solvent compatible with the rest of the system or be present as a stable dispersion of small particles. For the desired results, the average particle size is generally below 1.0 micron, preferably below 0.5 micron, and more preferably below 0.3 micron, as measured optically.

"Depolymerization" means degradation of the polymer to the point at which the degradation products are volatile at temperatures encountered in curing the final film. These degradation products can be monomers, dimers or oligomers.

"Vaporize" means volatilization of the degradation products and their evaporation from the film. Ideally, all of the degradation products pass from the film, but as a practical matter, a small but insignificant amount generally remains.

Illustrative of the polymers which can be used are polymers of one or more monoethylenically unsaturated monomers which also contain one or more monoethylenically unsaturated acid units.

Representative of these monoethylenically unsaturated monomers are alkyl acrylates and methacrylates having 1-8 carbon atoms in the alkyl group, styrene, alpha-methyl styrene and vinyl toluene. Representative of the monoethylenically unsaturated acids are acrylic acid, methacrylic acid, fumaric acid, itaconic acid and maleic acid (or anhydride). Mixtures of these polymers can also be used. The acid units of these polymers can optionally be esterified with glycidyl esters of 4-14 carbon atoms (total).

Preferred for the density and gloss of the finishes obtained when they are used are the polymers of alkyl acrylates, alkyl methacrylates, acrylic acid and methacrylic acid, esterified with a glycidyl ester sold by Shell Chemical Company as "Cardura E" ester, which is a mixed ester of the general formula

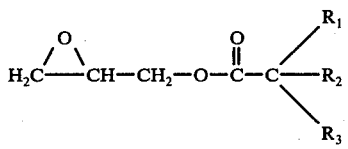

where
R$_1$ is CH$_3$ and
R$_2$ and R$_3$ are lower alkyl groups,
R$_1$, R$_2$ and R$_3$ containing a total of 7-9 carbon atoms.

The polymers especially preferred for the same reasons are
1. methyl methacrylate/2-ethylhexyl acrylate/methacrylic acid terpolymers, preferably the 40-50/48-52/1-4 (weight ratio) terpolymers;
2. butyl acrylate/methyl methacrylate/acrylic acid terpolymers esterified with "Cardura E," the units preferably present in a 23-27/33-37/15-19/21-25 ratio;
3. styrene/methyl methacrylate/acrylic acid terpolymers esterified with "Cardura E," the units preferably present in a 28-32/8-32/15-19/21-25 ratio;
4. methyl methacrylate/ethyl acrylate/methacrylic acid terpolymers, preferably the 37-41/55-59/1-6 terpolymers.

Such a polymer is ordinarily present in a composition of the invention at a concentration of about 2-300%, by weight of the fluoro-polymer, preferably about 5-20%. It can be made by any of the conventional polymerization and esterification techniques familiar to any polymer chemist.

It may be desirable for the composition to contain a metal compound which will catalyze the depolymerization of any polymer residue, whose presence might discolor the final finish.

This metal compound can be an oxide or hydroxide of (1)
copper
cobalt
iron
nickel
chromium
vanadium
tantalum
cerium
thorium
manganese
bismuth
cadmium
molybdenum
gallium
iridium
rhodium
platinum
palladium
tin
tungsten
lithium
sodium
potassium
lead
ytterbium or
silver or (2) at least one compound of the metals in (1), which compound decomposes in the temperature range of about 100° C–500° C to give at least 0.2%, by weight of the metal in the compound, of an oxide or hydroxide.

The metal compound, when it is used, will ordinarily be present in the composition at a concentration which will provide about 0.005–5 parts of metal per hundred parts of fluoropolymer used.

In some cases, it may also be desirable for the composition to contain an antioxidant to prevent discoloration of the final finish when cookware bearing the finish is subjected to excessive heat over a prolonged period. These antioxidants are, generally speaking, compounds containing phosphorus, sulfur, boron, or combinations of these. Illustrative of such compounds are the ortho-, meta- and pyro acids of these elements; their neutral and basic salts; their esters; and their organic- and organo-metallic derivatives.

The preferred antioxidants are phosphoric acid and its decomposable amine salts, 2-ethylhexyldiphenyl phosphate, magnesium glycerophosphate and iron glycerophosphate.

The antioxidants are ordinarily present in the compositions at a concentration of about 0.5%-10%, by weight of the fluoropolymer, pigment and mica, coated mica or metal flake.

The carrier used in the composition of the invention can be any of those normally used in compositions of this type. It is an inert, not a reactive or functional (in the sense of contribution to the working of the invention) component and its nature is therefore of secondary importance. The carrier serves only to keep the composition homogeneous and acts as a mechanism for conveying the solid components to the substrate. After a coating has been deposited, the carrier evaporates. It is necessary, therefore, only that it be compatible with the other components of the composition and that it have no adverse effects on the coating itself.

Commonly, the fluoropolymer used in the composition is provided in the form of an aqueous dispersion, and the water introduced into the composition with the polymer also serves as all or as part of the carrier for the composition. Organic liquids such as alcohols, ketones, aliphatic and aromatic hydrocarbons, or mixtures of these, can also be used.

The compositions of the invention can also contain such conventional additives as pigments, flow control agents, surfactants and plasticizers as are necessary or seem desirable. These additives are added for the usual reasons, in the usual ways and in the usual amounts.

The amount of total solids in the coating compositions will be governed by the substrate to which the compositions are to be applied, the method of application, the curing procedures, and like factors. In the usual case, the composition will contain about 10–80%, by weight, of solids.

The composition can be made by simply mixing together appropriate amounts of the proper components. Pigments can be added, if this is desired, by first conventionally preparing a suitable pigment dispersion and then adding this dispersion to the composition.

The compositions can be applied in any of the usual ways. Spraying roller-coating, dipping, doctor-blading — all are suitable, although spraying is generally the method of choice. The article to be coated is preferably pretreated by grit-blasting, by the flame-spraying of metals or by frit-coating. The article is then primed with a composition of the type disclosed in U. S. Pat. Nos. 3,655,604; 3,694,392; 3,986,993; 4,011,361; or 4,049,863. The disclosures in those patents are incorporated into this specification to show how such primer compositions are made and how they are applied.

The compositions of the invention are ordinarily applied to a thickness of about 20–30 microns (dry) and the coated article is then baked at a temperature and for a time sufficient to fuse the fluoropolymer used. The compositions of the invention are most useful for coating metal cookware, especially frypans, but the compositions can also be used to coat other articles requiring scratch resistant fluoropolymer coatings. These other articles can be made of glass or any other material capable of withstanding the baking temperatures used. For example, the compositions can be used to coat bearings, valves, wire, metal foil, boilers, pipes, ship buttoms, over liners, iron sole-plates, waffle irons, ice cube trays, snow shovels and plows, chutes, conveyors, dies, tools such as saws, files and drills, hoppers and other industrial containers and molds.

The following examples illustrate the invention. In these examples, all parts and percentages are by weight unless otherwise indicated.

EXAMPLE 1

The following were mixed, in the order listed:

| (1) | PTFE dispersion (60% solids in water, "Teflon" ® *TFE-Fluorocarbon* Resin, Aqueous Dispersion, T-30, sold by E. I. du Pont de Nemours and Company) | 64.9 parts |
|---|---|---|
| (2) | Deionized water | 10.5 parts |
| (3) | TiO₂ coated mica ("Afflair" ® Pigment flake NF-140-D, sold by E. I. du Pont de Nemours and Company) | 4.00 parts |
| (4) | Red mill base made by ball milling a mixture of Red iron oxide 44.9% Deionized water 33.7% Oleic acid Triethanolamine 6.7% Butylcarbitol 2.9% Toluene 8.5% | 0.2 part 3.3% |
| (5) | A mixture of Triethanolamine 0.92 part Oleic acid 0.75 part Toluene 3.48 parts Butyl carbitol 1.3 parts | |
| (6) | Methyl methacrylate/ethyl acrylate/methacrylic acid 39/57/4 terpolymer dispersion (40% in water) 0.2 micron average particle size | 14 parts |

The resulting composition was applied to an aluminum frypan which had been first fritcoated and primed with a primer as follows:

1. The following were mixed together:

| PTFE dispersion aqueous, 60% solids | 478.76 parts |
|---|---|
| Deionized water | 130.23 parts |
| Colloidal silica sol, 30% solids in water ("Ludox AM" colloidal silica, E.I. du Pont de Nemours and Company) | 327.18 parts |

2. The following were separately mixed:

| "Triton X-100" (Nonionic surfactant sold by Rohm & Haas Co.) | 17.52 parts |
|---|---|
| Toluene | 34.56 parts |
| Butyl carbitol | 13.36 parts |
| Silicone (Dow Corning DC-801, 60% solids in xylene) | 34.56 parts |

85.52 parts of (2) were added to (1) in a small stream, with stirring, over a 2–3 minute period. To this were then added, with stirring,

| TiO₂ (45% solids dispersion in water) | 35.46 parts |
|---|---|
| Channel black (22% solids dispersion in water) | 0.85 parts |

Stirring was continued for 10–20 minutes. The resulting composition was then sprayed to a frit-coated aluminum frypan to a thickness of 0.2–0.6 mil (dry) and dried in air. The pan was then ready for topcoating with a conventional PTFE enamel. The composition was applied by spraying on top of the primer to a thickness of 25 microns (dry). The coated pan was then baked for 5 minutes at 425° C to give a scratch-resistant gold finish.

EXAMPLE 2

The procedure of Example 1 was repeated, except that the following were substituted for (3) and (4):

| | | |
|---|---|---|
| (3) | TiO₂ coated mica ("Afflair" NF-154-D, sold by E. I. du Pont de Nemours and Company) | 4 parts |
| (4) | Mill base made by ball milling a mixture of Deionized water 55% Cobalt oxide blue 45% | 0.2 part |

The resulting composition was applied to a frit-coated, primed aluminum frypan, as in Example 1 to give a scratch-resistant silver finish.

EXAMPLE 3

The following were mixed, in the order listed:

| | | |
|---|---|---|
| (1) | PTFE dispersion of Example 1 | 69.7 parts |
| (2) | Deionized water | 8.7 parts |
| (3) | TiO₂ coated mica ("Afflair" NF-140-D, sold by E. I. du Pont de Nemours and Company) | 1.0 part |
| (4) | Red mill base of Example 1 | 0.2 part |
| (5) | The mixture in (5) of Example 1 | 6.45 parts |
| (6) | The dispersion in (6) of Example 1 | 14.0 parts |

The resulting composition was applied to a frit-coated, primed aluminum frypan, as in Example 1, to give a scratch-resistant copper finish.

EXAMPLE 4

The following were mixed, in the order listed:

| | | |
|---|---|---|
| (1) | PTFE dispersion of Example 1 | 737.18 parts |
| (2) | Deionized water | 66.4 parts |
| (3) | Yellow mill base made by ball milling a mixture of Yellow iron oxide 45% Deionized water 54.5% Polynaphthalene 0.5% sulfonate | 2.81 parts |
| (4) | Blue mill base made by ball milling a mixture of Cobalt blue oxide 45% Deionized water 55% | 2.81 parts |
| (5) | TiO₂ coated mica ("Afflair" NF-152-D, sold by E. I. du Pont de Nemours and Company) | 9.78 parts |
| (6) | A mixture of Butyl carbitol 12.42% Toluene 30.99% Cerous octoate 4.83% Triethanolamine 36.96% Oleic acid 9.84% "Triton-X100" 4.96% (nonionic surfactant sold by Rohm & Haas Co.) | 138.79 parts |
| (7) | The dispersion of Example 1(6) | 137.22 parts |

The resulting composition was applied to an aluminum frypan, which had been first gritblasted and primed with the primer described in Example 2 of U.S. Pat. No. 4,049,863.

The composition was applied by spraying it to a thickness of 25 microns (dry). The coated pan was then baked for 5 minutes at 425° C to give a scratch-resistant silver finish.

EXAMPLE 5

The following were mixed, in the order listed:

| | | |
|---|---|---|
| (1) | PTFE dispersion of Example 1 | 730.53 parts |
| (2) | Deionized water | 22.7 parts |

-continued

| | | |
|---|---|---|
| (3) | Black mill base made by ball milling a mixture of Channel black 20% Aluminum silicate 10% Polynaphthalene 3% sulfonate Water 67% | 114.95 parts |
| (5) | A mixture of Deionized water 60.97% Phosphoric acid (85%) 6.47% Triethanolamine 32.56% | 60.48 parts |
| (6) | The dispersion of Example 1(6) TiO₂ coated mica ("Afflair" NF-152-D, sold by E. I. du Pont de Nemours and Company) | 129.67 parts 9.45 parts |

The resulting composition was applied to a primed aluminum frypan, as shown in Example 4, to give a scratch-resistant black finish.

We claim:

1. A coating composition consisting essentially of
   (a) about 80–99.8%, by weight of the total of (a) and (b), of a particulate polymer polymerized or copolymerized from monomers selected from one or more monoethylenically unsaturated hydrocarbon monomers and hydrocarbon ether monomers, said monomers being completely substituted with fluorine atoms or a combination of fluorine atoms and chlorine atoms;
   (b) about 0.2–20%, by weight of the total of (a) and (b), of mica particles, mica particles coated with pigment, or metal flake;
   the total of (a) and (b) equaling 100%;
   (c) about 2–300%, by weight of (a), of one or more polymers of monoethylenically unsaturated monomers which depolymerize and whose depolymerization products vaporize in the temperature range of about 150° C below the fusion temperature of (a) to about the decomposition temperature of (a); and
   (d) a liquid carrier,
   said coating composition being suitable for forming finishes having improved scratch resistance.

2. The composition of claim 1 in which (b) is present at a concentration of about 2–15%, by weight of the total of (a) and (b).

3. The composition of claim 1 in which (b) is present at a concentration of about 8–12%, by weight of the total of (a) and (b).

4. The composition of claim 1 wherein the polymer in (a) is PTFE.

5. The composition of claim 1 wherein the mica particles in (b) are coated with an oxide of titanium, zirconium, aluminum, zinc, antimony, tin, iron, copper, nickel, cobalt, chromium or vanadium.

6. The composition of claim 1 wherein the polymer in (c) contains one or more monoethylenically unsaturated carboxylic acid units.

7. The composition of claim 1 wherein the polymer in (c) is in solution.

8. The composition of claim 1 wherein the polymer in (c) has an average particle size of less than about 1.0 micron.

9. The composition of claim 1 wherein the polymer in (c) has an average particle size of less than 0.5 micron.

10. The composition of claim 1 wherein the polymer in (c) has an average particle size of less than about 0.3 micron.

11. The composition of claim 6 wherein the polymer in (c) is of one or more of an alkyl acrylate or methacrylate having 1-8 carbon atoms in the alkyl group, styrene, alpha-methylstyrene, vinyl toluene and the acid units is of acrylic acid, methacrylic acid, fumaric acid, itaconic acid, or maleic acid, optionally esterified with a glycidyl ester of 4-14 carbon atoms (total).

12. The composition of claim 1 wherein the polymer in (c) is
   (1) a methyl methacrylate/acrylate/methacrylic acid terpolymer,
   (2) a butyl acrylate/methyl methacrylate/acrylic acid terpolymer, esterified with a mixed ester having the structure

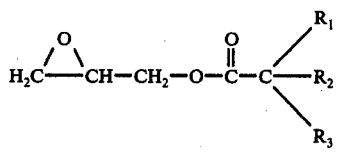

where
   $R_1$ is $CH_3$ and
   $R_2$ and $R_3$ are lower alkyl groups,
   $R_1$, $R_2$ and $R_3$ containing a total of 7-9 carbon atoms
   (3) a styrene/methyl methacrylate/acrylic acid terpolymer esterified with a mixed ester having the structure

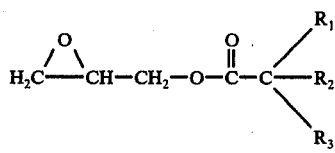

where
   $R_1$ is $CH_3$ and
   $R_2$ and $R_3$ are lower alkyl groups,
   $R_1$, $R_2$ and $R_3$ containing a total of 7-9 carbon atoms or
   (4 a methyl methacrylate/ethyl acrylate/methacrylic acid terpolymer.

13. The composition of claim 1 wherein the carrier in (d) is water.

14. The composition of claim 1 wherein the polymer in (a) is PTFE, the mica particles in (b) are coated with titanium dioxide, the polymer in (c) is a methyl methacrylate/ethyl acrylate/methacrylic acid terpolymer and the carrier in (d) is water.

15. A method for improving the scratch resistance of a finish derived from a coating composition containing
   (a) a particulate polymer polymerized or copolymerized from monomers selected from one or more monoethylenically unsaturated hydrocarbon monomers and hydrocarbon ether monomers, said monomers being completely substituted with fluorine atoms or a combination of fluorine atoms and chlorine atoms;
   (b) one or more polymers of monoethylenically unsaturated monomers which depolymerize and whose depolymerization products vaporize in the temperature range of about 150° C below the fusion temperature of (a) to about the decomposition temperature of (a); and
   (c) a liquid carrier,
the method comprising adding to the composition, before it is applied, mica, mica coated with a pigment, or metal flake, in the amount of 0.2-20%, by weight of the total of fluoropolymer and mica, coated mica, or metal flake.

* * * * *